INVENTOR.
William B. Barnes,

Oct. 30, 1945.  W. B. BARNES  2,388,204
PLANETARY TRANSMISSION
Filed May 19, 1941  4 Sheets-Sheet 3
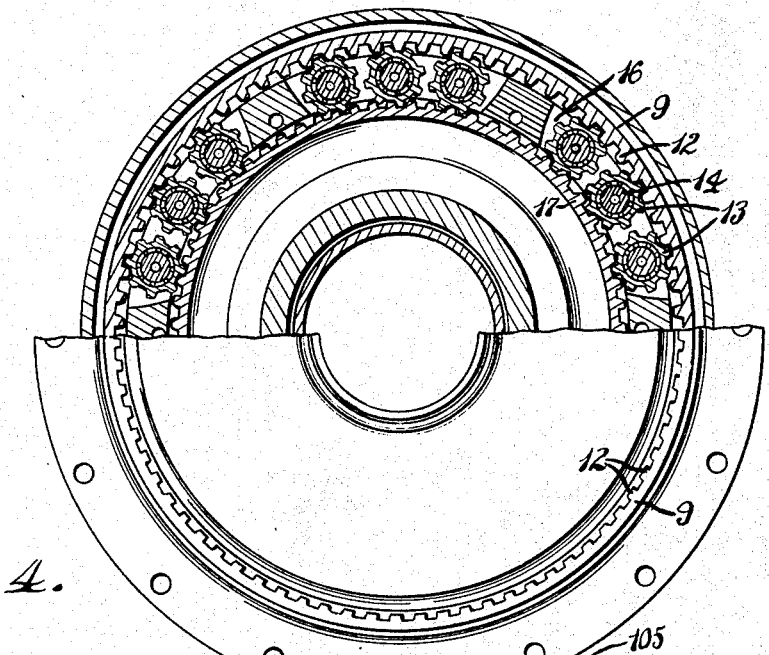
Fig. 4.
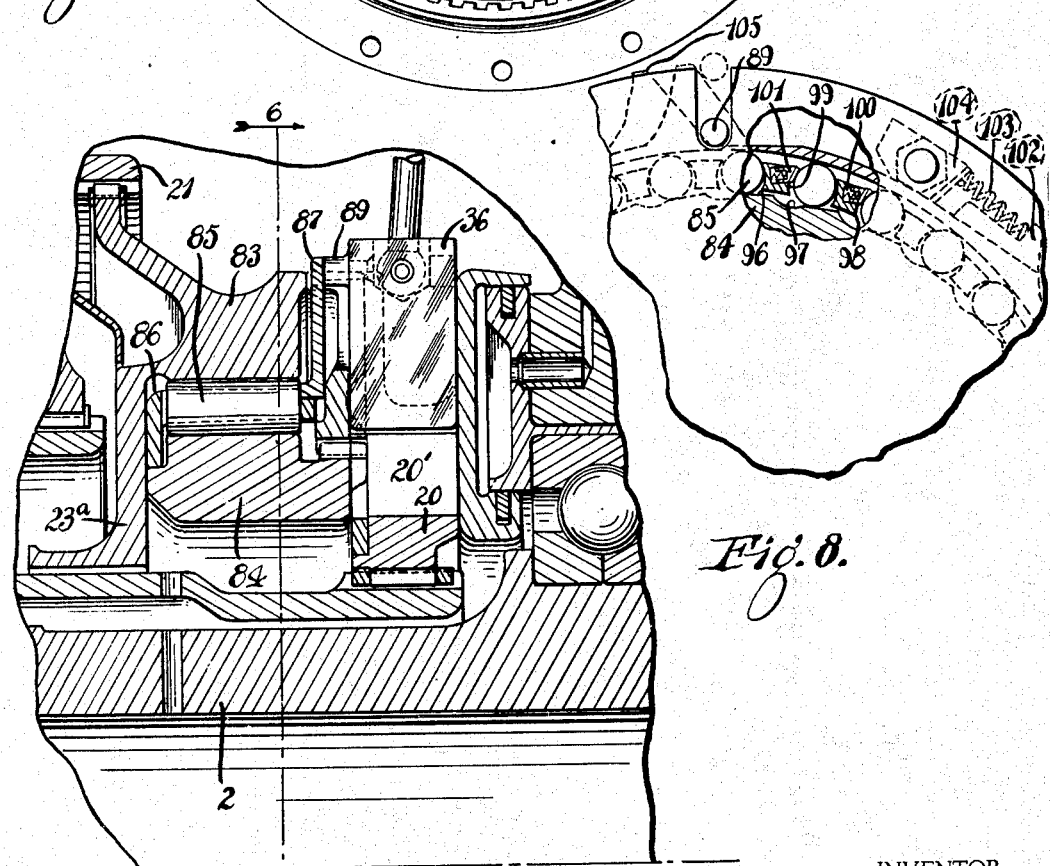
Fig. 5.
Fig. 8.
INVENTOR.
William B. Barnes,
BY Hood & Hahn.
ATTORNEYS Oct. 30, 1945.    W. B. BARNES    2,388,204
PLANETARY TRANSMISSION
Filed May 19, 1941    4 Sheets—Sheet 4

INVENTOR.
William B. Barnes,
BY
ATTORNEYS

Patented Oct. 30, 1945

2,388,204

UNITED STATES PATENT OFFICE 2,388,204

PLANETARY TRANSMISSION

William B. Barnes, Muncie, Ind., assignor to Barnes Motor Developments Company, Muncie, Ind., a partnership composed of William B. Barnes and Freda Arthur Barnes Application May 19, 1941, Serial No. 394,060

36 Claims. (Cl. 74—269)

The present invention relates to improvements in transmissions, and particularly to transmissions of the change-speed type.

More specifically, the invention relates to a change-speed transmission of the planetary gear type, wherein a shift from one speed to another speed may be made, with a minimum of effort on the part of the operator.

My transmission is primarily designed for the driving of the propeller of an airplane from the driving engine. It is a well recognized fact that considerable take-off advantage may be obtained in the operation of airplanes if the propeller may, during the take-off of the plane, be operated at a relatively higher speed than after the plane has attained flying condition. After the airplane has attained the desired flying conditions, it is desirable to drive the propeller at a lower speed, however, with the engine operating, as a rule, at or near its maximum efficiency.

Heretofore, one difficulty which has been experienced in obtaining the above results is the difficulty of obtaining a suitable driving transmission between the propeller and the engine which, while giving the desired results, will be sufficiently compact and which will be readily operable. Obviously, a structure having the minimum of weight, giving at the same time the above advantages of shifting from one speed to another, is highly desirable.

It is one of the objects of my invention to provide a transmission whereby the above results may be accomplished in a simple manner. Other objects of my invention will appear more fully in the accompanying specification and claims.

For the purpose of illustrating my invention, I have shown an embodiment thereof in the accompanying drawings, in which:

Fig. 4 is a sectional view taken on the line 4—4 of Fig. 1;

Fig. 5 is a detail section of a modification of the brake for the relatively slow speed gear;

Fig. 8 is a detail section of a further modification of the brake for the relatively slow speed gear.

Figure 1:
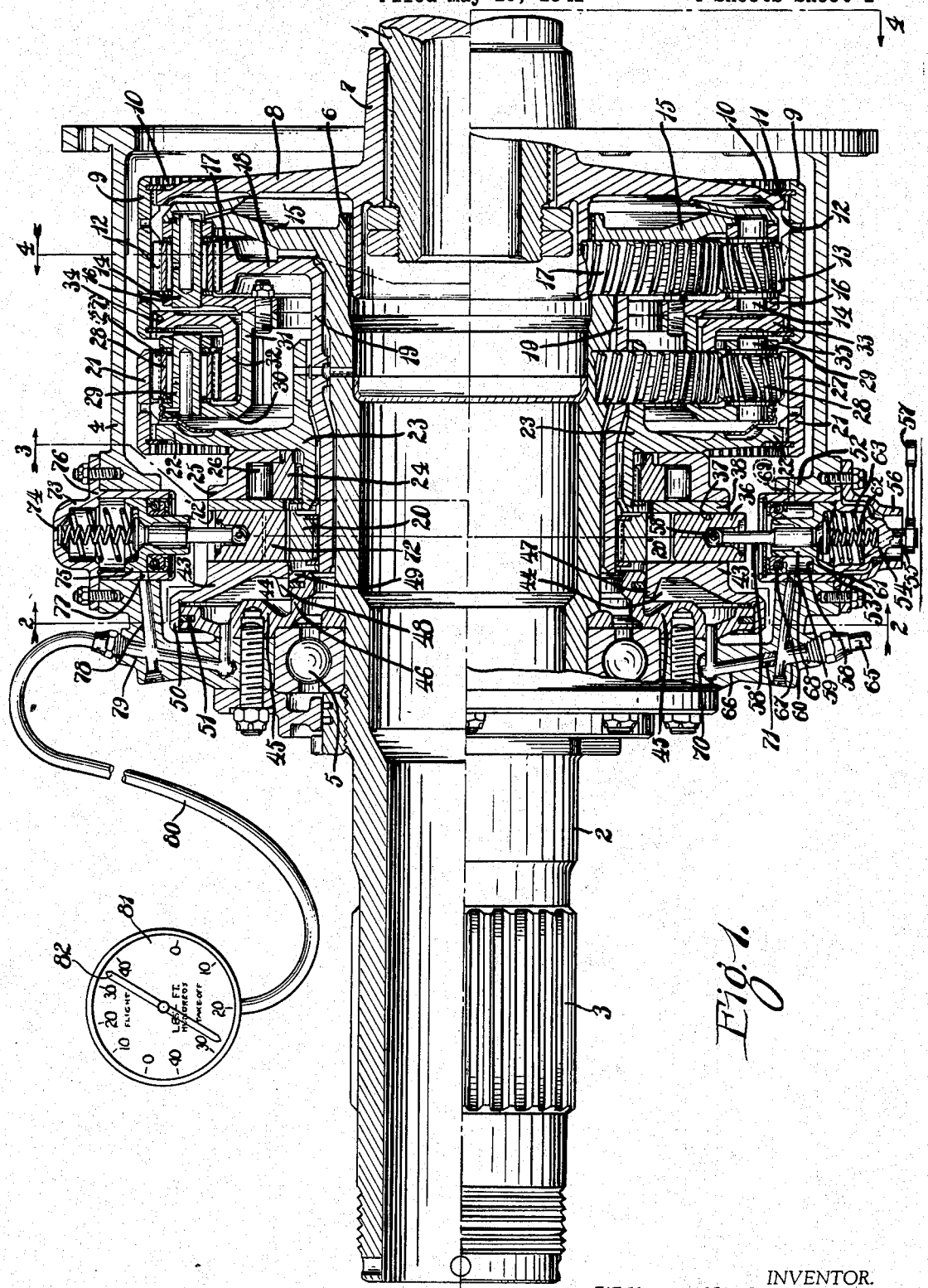
Fig. 1 is a longitudinal sectional view, parts being shown in full, of a transmission embodying my invention.
Figure 2:
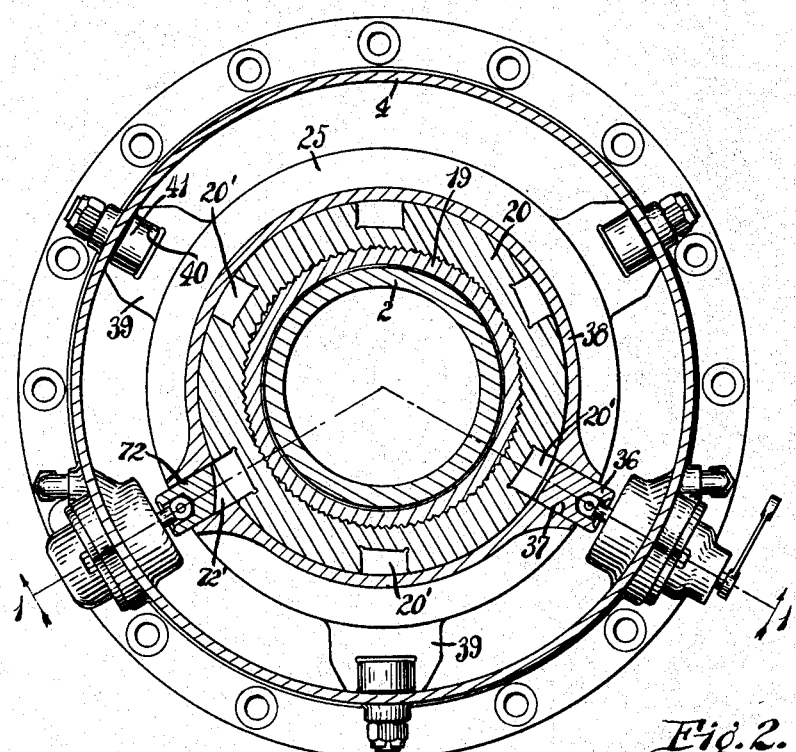
Fig. 2 is a sectional view taken on the line 2—2 of Fig. 1.
Figure 3:
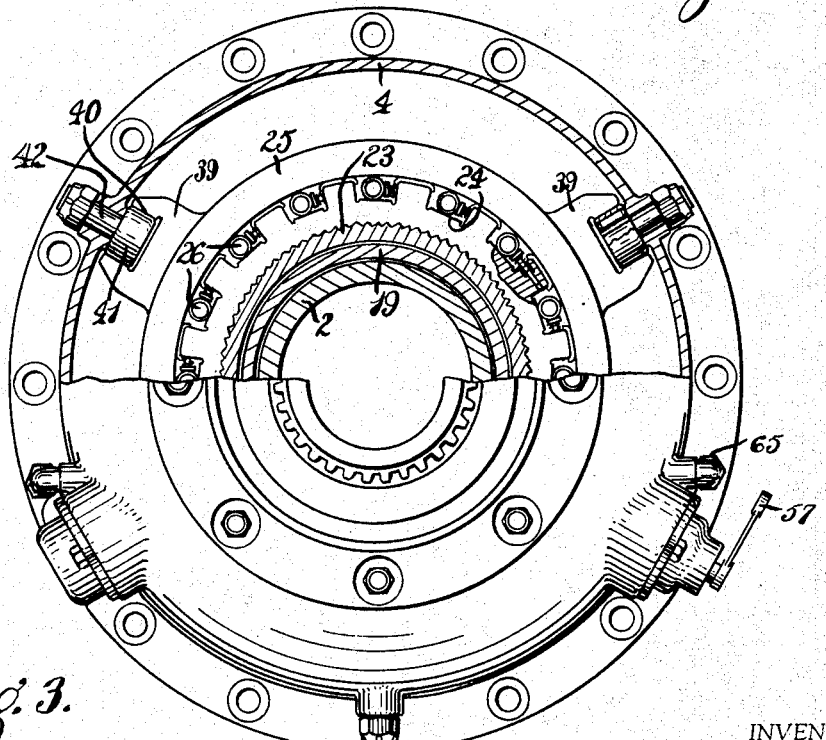
Fig. 3 is a sectional view taken on the line 3—3 of Fig. 1.

In the embodiment of the invention which is illustrated as being specifically adapted for driving an airplane, the shaft 1 is the driving shaft, being adapted to be connected to and driven from the propelling engine. The shaft 2 is the driven shaft being adapted to have suitably fastened thereon, as by splines 3, or other securing means, the propeller of the airplane.

The shaft 2 is supported within the enclosing housing or casing 4, a suitable ball or other antifriction bearing 5 being provided at one point, and at its inner end upon the driving shaft 1 as at 6. The driving shaft 1 is suitably supported from the necessary bearings within the engine casing and has its end projecting into the housing 4. The driving shaft 1 carries, and has splined thereon, a hub 7 provided with a disc 8, the outer end of which carries a ring gear member 9 provided with teeth 10 locking with teeth 11 on the periphery of the disc 8, so that the ring gear member 9, the disc 8, and the hub 7 constitute, in effect, a single driving member. The ring gear member 9 is provided with a set of internal driving teeth 12. These ring gear teeth 12 are adapted to mesh with and drive a plurality of pinion gears 13 mounted on suitable pinion shafts 14, preferably hollow, and having oil ducts for conveying oil to the bearings of these pinions 13. These pinion shafts are mounted within a pinion cage, one member of which comprises a disc 15 secured to or forming a part of the hollow driven shaft 2. The other member of the cage comprises an annulus 16. The pinions 13 in turn are adapted to mesh with a sun gear 17 which is mounted on or forms a part of a disc 18, in turn mounted upon or forming a part of a sleeve 19 surrounding the shaft 2. This sleeve, at the end opposite the disc 18, has splined thereon a holding disc or hub 20 which, in turn is provided with a plurality of radially extending recesses or notches 20' for a purpose which will more fully hereinafter appear.

Therefore, with the sun gear sleeve 19 held against rotation, in a manner to be more fully hereinafter described, and the driving shaft driving the ring gear member 9, the shaft 2 will be driven at a relatively fast speed, relatively slower, however, than the speed of the driving shaft 1, through the medium of the pinions 13 and the disc 15.

For establishing a second and relatively slow speed, I provide a second planetary gear drive, the ring gear 21 of which is mounted on a disc 22 in the same manner as that of the ring gear member 9 on the disc 8. This disc 22 is mounted on a sleeve 23 surrounding the sleeve 19. The sleeve 23 is locked against rotation in one direction through the medium of an overrunning brake which includes a cam member 24, splined on the sleeve 23; a reaction hub 25 locked against rotative movement, being secured to a wall of the casing 4, and the brake rollers 26 which are interposed between the reaction hub and the cam member. This ring gear member 21 has internal teeth 27 which, in turn, mesh with pinions 28 mounted on pinion shafts 29, in turn, supported in a pinion cage. One member 30 of the cage is carried on a hollow cylindrical casing 31, in turn bolted to and driven from the cage member 16. The sun gear 32 meshing with the pinions 28 telescopes the cylindrical casing 31 and is provided with an annular flange 33 having teeth 34 at its outer periphery interlocking with teeth 35 on the ring gear member 9 so that, in this instance, the sun gear is driven from the shaft 1 through the ring gear member 9. The ring gear member 21 is, in this set of gears, the reaction member, being held against rotation backwards through the overrunning brake, heretofore described. By this arrangement, if the sun gear 17 of the first speed gear set is released, to permit it to rotate freely, there will be no drive through the first speed gear set. However, under these conditions, the second speed planetary gear set will automatically come into operation to effect the lower speed ratio drive between the shafts 1 and 2. On the other hand, with the sun gear sleeve 19 held against rotation, the drive will be effected through the higher or first speed planetary gear drive without in any way affecting the lower speed driving mechanism, due to the fact that the overrunning brake will permit the ring gear member 21 to rotate freely forward under this higher speed drive.

For holding the sun gear 17 against rotative movement, when it is desired to establish the relatively high speed drive of the shaft 2, I provide a braking pawl 36 which is adapted, under predetermined conditions, to engage in one of the radial notches 20' in the holding ring 20. This pawl is radially movable in a guide slot 37 formed in an anchor ring 38 surrounding the sleeve 23. This anchor ring 38, for purpose more fully hereinafter described, while being held against rotative movement, is permitted a certain amount of axial movement and to permit this axial movement and at the same time hold the ring against rotative movement. The anchor ring is provided with a plurality of anchor lugs 39 radially extending from the periphery of the ring. Each of these lugs is provided with a notch 40 adapted to receive a roller 41 carried on a stud 42 anchored in the casing 4. By this arrangement, while the ring is held against rotative movement, a certain amount of axial movement is permitted thereof. One face of this ring has secured thereto the reaction hub 25 of the overrunning brake for the ring gear member 21 so that this brake likewise will be held against rotative movement and it will be noted that this reaction member 25 just fills the space between one face of the anchor ring 38 and the disc 22.

The opposite face of this anchor member forms one wall 43 of a pressure chamber 44, the opposite wall 45 of which is secured to the end member of the casing 4. This wall member 45 is provided with a hub 46 which is overlapped by an annular lip 47 on the anchor ring 38. However, this lip is provided with an escape slot 48 which cooperates with an escape slot 49 in the hub 46. This arrangement provides a means whereby, when the anchor ring is moved axially to the left, the escape openings 49 gradually shut off the escape of any pressure developed in the chamber 44. The anchor ring is also provided with an annular flange 50 which overhangs the periphery of the wall member 45, a sealing ring 51 being interposed between these parts to effectually seal the chamber 44 while permitting axial movement of the anchor ring 38 relative to the wall member 45.

The dog 36 is moved into and out of locking position through the medium of a control member mounted in a wall of the casing 4. To this end, the wall of the casing is provided with a hollow boss 52 within which is mounted a rotatable cylinder 53. This cylinder has a top dome 54 which is provided with an operating stem 55 extending through a cap 56 bolted on the exterior of the boss 52 and providing a means for maintaining the cylinder in position while permitting the same to freely rotate. An operating handle 57 is secured to the stem 55 for rotating the cylinder.

Operating within this cylinder is a piston 58 having a hollow extension 59 provided with a sealing ring 60 which effectually seals the space between this sleeve 59 and the bottom of the cylinder 53 to thereby provide a pressure chamber within the cylinder 53. This ring, of course, is prevented from being forced out of the open end of the cylinder through the medium of a suitable split ring or other suitable means. This piston 58 is connected with the dog 36 through the medium of a piston rod 58' having a ball and socket connection 58'' with the dog. The rod extends through the piston and is provided at its end with an enlarged head 61 so arranged that when the piston is moved outwardly, it will move the rod with it although the piston can be moved inwardly without necessarily moving the rod. For moving the dog 36 in an engaged position, I provide a coiled spring 62 which bears against the top 61 of the piston rod biasing the piston rod and with it the dog 36 into engaged position. In addition to this coiled spring 62, I also provide a supplemental spring 63 which bears on the top of the piston for biasing the piston in its projected position.

Fluid pressure for the operation of the piston 58 is adapted to be supplied from the oil used for the purpose of lubricating the engine. This oil is supplied to the engine under a fairly high pressure through a suitable pump and a portion thereof may be used for the operation of the piston 58. To this end, I provide a supply line 65 which leads to the engine oil supply and communicates with suitable passages 66 and 67, the passage 67 being adapted to deliver oil to the cylinder 52 through the medium of a port 68 in the cylinder. This port 68 is also adapted to be placed in communication with an escape passage 69 leading to the interior of the casing so that under proper circumstances, the pressure in the cylinder 52 may be vented. When the cylinder 52 is rotated through the handle 57 to the position illustrated in Fig. 1, the oil under pressure will be admitted to this cylinder, thereby moving the piston radially outwardly to thus move the dog 36 out of engagement with one of the notches 20' to thus disconnect the dog from the brake ring 20 to permit free rotation of the sun gear 17. However, if the handle 57 is rotated a sufficient distance, it will, of course, move the inlet port of the cylinder out of communication with the passage 68 and place this inlet port in communication with the escape port 69, thus permitting the flow of pressure out of the cylinder and permitting the spring 62 to move the dog into engagement. The same fluid pressure which is used for the operation of the dog 36 is also fed to the fluid pressure chamber 44 through a passage 70 communicating with the passage 66. In order, however, to insure a proper pressure being established in the cylinder 58, when desired, I provide a restriction 71 in the passage 66 just beyond the passage 67.

There are certain occasions when the propeller is being operated through the relatively low speed drive, wherein the propeller might be disconnected from the engine. Under these circumstances, the plane will be coasting and thus there is a tendency for the drive, through the relatively low speed gearing, to be in reverse. Under these circumstances, the overrunning brake would be running in the opposite direction and the propeller would have no effect in driving the engine. Under these conditions, the engine might die and if the pilot wished to again start his engine, it might not "take hold" quickly enough. Therefore, to take advantage of the windmilling of the propeller, I provide a secondary dog 72 for locking the sun gear sleeve 19 and with it the sun gear 17 against rotation. This dog is likewise radially movable in a suitable slot 72' in the anchor member 38 but it will be noted that the face of this dog is sharply cammed in one direction so that as long as there is a forward drive of the sleeve 19 with the dog 36 disengaged, the dog 72 will not hold the sleeve against rotation. If, however, the plane is coasting with the engine shut off, this dog 72 will move into one of the recesses 20' thereby establishing a drive between the engine and the propeller so that the engine will be kept turning over, even though the dog 36 is in released position and the drive had heretofore been through the relatively low speed gearing. The dog 72 is moved to retracted or disengaged position by a fluid pressure motor 73 similar in general construction to the fluid pressure motor for controlling the dog 36. The dog is biased into its engaged position by a coiled spring 74 and moved to its disengaged position by the action of the piston 75 of this fluid pressure motor 73. However, the cylinder 76 of the fluid pressure motor 73 is not rotatable and, therefore, the port 77 thereof is always in communication with the passage 78 which, in turn is in communication with the passage 79 communicating with the pressure chamber 44. It is unnecessary to provide any control means for the fluid pressure to the motor 73 simply because this motor is operative to maintain the dog 72 in its retracted position, so long as the engine is delivering a torque drive. So long as the engine is delivering torque drive, there will be oil pressure developed in the pressure chamber 44 and in the cylinder 76 of the motor 73. As before stated, the dog will come into operation when, for instance, the plane is coasting into a landing with the engine shut off. Under these circumstances, the engine would not be turning over sufficiently to operate the oil pump and, therefore, no pressure would be delivered to the motor 73 and the spring 74 could become effective.

It is to be noted that the gears of the transmission, heretofore described, are of the helical type. Therefore, there is a tendency for these gears to effect an axial displacement of the parts carrying the gears. The disc 8 is fixed against axial displacement on the shaft 1. However, the disc 23 is not so fixed against axial displacement and under a torque load there will, therefore, be a tendency for the gears to move the disc 23 axially. Due to the fact that the anchor disc member 38 is also movable axially, as the reaction member 25 of the overrunning brake fills the space between the anchor disc 38 and the disc 23, the anchor disc 38 will be moved axially under the thrust of the gears. The axial movement of the disc 38 will tend to close the discharge openings 48 and 49 to a greater or less extent, depending upon the torque delivered by the engine, and therefore the axial displacement of the gears and, as a result, with a fixed fluid pressure supplied to the chamber 44, the fluid pressure in this chamber will vary in accordance with the torque load. Advantage is taken of this fact to provide an indication of the torque developed by the engine, by connecting the passage 79 by a suitable conduit 80 with an indicator 81 so that the pressure developed in the chamber 44 will, through the conduit 80 act upon the indicator needle 82 of the indicator, thus enabling the operator to readily observe the torque developed by the engine itself.

Due to the cam and roller construction of the overrunning brake, including the parts 24, 25 and 26, there is a certain amount of elasticity in the parts and as a result, there is a certain amount of elastic deflection of the parts when a driving force or torque is applied thereto and from which deflection the parts recover when the torque is removed. The driving torque imposed on this brake as a result of the torque imposed on the shaft 1 from the driving engine is intermittent. The engine, particularly as shown in the drawings, is a gasoline engine provided with a crank shaft and, as a result, a torque imposed upon the overrunning brake is intermittent with corresponding periods when no torque is imposed. To be sure, these intermittent pulses are extremely rapid. As a result of this pulsating torque which is applied at tuned frequencies, a tuned resonance is set up in the roller brake. This is accentuated by the fact that the propeller acts as a fly wheel and as a result of the tuned resonance set up in the roller brake, a destructive vibration is set up therein resulting, at least in some instances, in the destruction of the brake. It is to be noted, however, that the anchor member 43 of which the reaction member 25 forms a part, receives a pressure from the disc 23, which pressure is opposed by the oil pressure in the pressure chamber 44. As has heretofore been explained, there is a tendency for the plate 23 to move axially as a result of the helical type of gear used in the transmission. Thus, when torque is applied through the medium of the shaft 1 to these gears, these gears exert an axial pressure against the reaction member 25, which pressure, of course, is opposed to the oil pressure in the chamber 44. The pressure against the reaction member 25 or the disc 23 as a result of this tendency of axial movement acts as a friction dampener which dampens out the resonance set up in the overrunning brake to such an extent that the destructive vibration is effectually prevented irrespective of the fact that the pulsating torque applied to the overrunning brake would, under normal circumstances, tend to destroy this brake.

In operation, assuming that the transmission is used for the purpose of driving the propeller of an airplane, initially, with the engine of the ship dead, the pilot will set his control handle 57 to prevent admission of fluid pressure into the motor controlling the dog 36. The engine is started in the usual manner by the inertia starter or other starting device and, during the starting period, of course, the engine is not developing any fluid pressure in either motor controlling the dog 36 or in the motor 73. Therefore, the springs of both of these motors are biasing the dogs into engaging position. It is quite possible that, during this starting period, the dogs 36 might not take hold but, in order to take advantage of the inertia of the propeller during the turning over of the engine by the inertia starter, the dog 72 will surely take hold, due to its shape. Therefore, the engine will be connected with the propeller and advantage may be taken of the propeller inertia to help turn the engine over. As soon as the engine turns over, however, and is revved or speeded up to full throttle operation, the fluid pressure developed will pull the dog 72 out of its recess. Due to the fact that there is the tendency to drive the anchor ring, the thrust on the dog will be relieved on the back of this dog. At the same time, the dog 36 will engage, if it has not already done so, with one of the notches 20'. This locks the sun gear 17 against rotation, thereby establishing a drive to the propeller shaft through the relatively high speed planetary gear drive, including the pinions 13. After the ship has attained the desired elevation and the pilot desires to shift then into flight gear, which is the relatively slow speed gear including the pinions 28, he first, through the manipulation of the handle 57, admits pressure to the piston controlling the dog 36. However, due to the fact that there is a thrust on this dog, this dog will not immediately pull out. The operator then, through the manipulation of his engine throttle, will reduce the engine speed momentarily, thus establishing a more or less of a coast on the dog 36, relieving the dog of the thrust and, as soon as this coast is established, the dog pulls out under the fluid pressure. This disconnects the drive through the relatively high speed gear and the drive through the relatively low speed gearing will automatically be established, because the one-way brake will immediately take effect, locking the ring gear member 21 against rotation, thus providing a reaction member for the relatively low speed planetary gearing.

Figure 6:
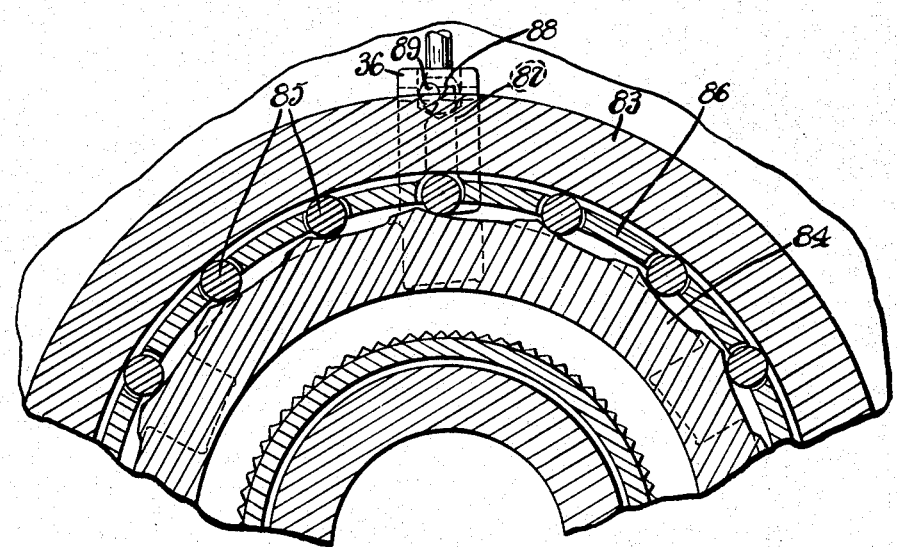
Fig. 6 is a sectional view taken on the line 6—6 of Fig. 5.

In Figs. 5 and 6, I have illustrated a structure whereby I provide means for insuring that there will be no engagement of the automatic brake for holding the relatively slow speed gear in operative condition so long as the relatively high speed gear is in operation. In this structure, the sleeve 23a, to which the ring gear member 21 is attached, is provided with an annular engaging member 83 between which and a cam member 84 which is rotatively stationary, are arranged the braking rollers 85. These rollers are mounted in a cage 86 which is provided with an upwardly extending arm 87 provided with a cam surface 88. On the dog 36, I provide a pin 89 which is adapted to engage the cam surface 88. As long as the dog 36 is in its retracted position, the pin 89 will be out of the path of the arm 87 and, therefore, the cage and with it the rollers 23a, will be free to move into an engaging position to lock the sleeve 23a against rotation. However, when the dog 36 is moved into engaging position so that it engages in one of the recesses 21 in the locking disc 20, the pin 89 will move downwardly with the dog engaging the cam face 88, thus rocking the arm 87 to the right, looking at Fig. 6, thus rotating the cage 86 and with it the rollers 85 so that the rollers are moved out of engaging position with the cams of the cam member 84, and so long as this pin 89 is in the path of the arm 87, the cage and with it the rollers will be prevented from moving into engaging position. As soon, however, as the dog 36 is moved into disengaged position, thus moving the pin 89 out of the path of the arm 87, the braking rollers will be free to move into braking position, thus locking the ring gear member 21 against rotation and establishing the relatively slow speed drive.

Figure 7:
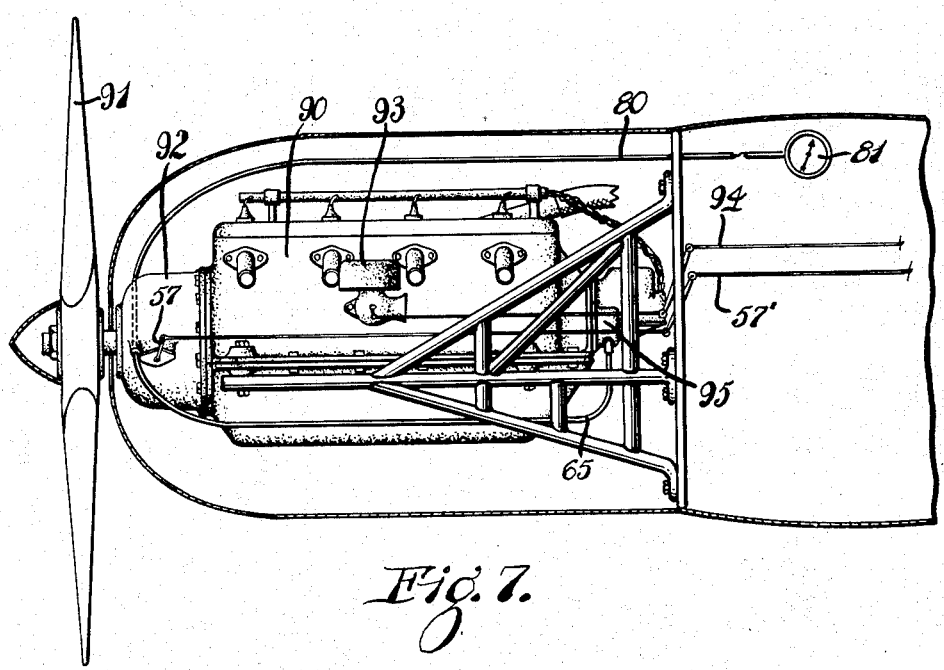
Fig. 7 is a side elevation, the cover being broken away, of a propeller drive, together with the engine embodying my invention.

In Fig. 7, I have shown, more or less diagrammatically, a drive for a propeller shaft for a propeller of an airplane from a driving engine. In this figure, the driving engine is illustrated at 90 and between this engine and the propeller 91, I have shown the transmission gearing, generally indicated in Fig. 7, by the reference numeral 92. The carbureter for controlling the fuel feed to the engine is illustrated at 93 and it is to be noted that this carbureter is connected with a suitable throttle control 94. The oil pump for the engine is illustrated at 95 and this oil pump is shown as delivering, in addition to the oil supply to the engine, to the conduit 65 which leads to the control member for the dog 36. The arm 57 of this control member is provided with a suitable control connection 57' leading to a control handle or other suitable means in the cock-pit of the airplane.

As shown, the indicator 81 is also mounted in the cock-pit of the airplane so that this could be very readily seen by the pilot.

In the structure illustrated in Fig. 8, I have provided a roller and cam arrangement for the brake mechanism for the slow speed drive, wherein I have provided means for insuring the riding of all of the rollers on their respective cams into engaging position irrespective of any slight variation in the diameter of the rollers. In this structure, the cam member 84 is provided with a series of cam surfaces 96 on which the rollers 85 are adapted to roll for locking the control gear of the planetary gearing against rotation. Associated with each of these cam surfaces 96 is a roller gullet 97. The rollers 85 are arranged in a cage 98 provided with cage-receiving slots having arcuate side walls 99. The axes of the rollers 85 are offcentered toward the cam with respect to the axes of the arcuate walls 99. The cage 98 has formed in the face of one of the walls of each roller slot a pair of sockets 100 set at an angle and containing spring pressed plungers 101 bearing on the rollers 85, and it is to be noted that the angle of inclination and therefore the angle of movement of the plungers is above the axes of the rollers. Therefore, each individual roller, within the cage, is biased under the influence of the springs of the plungers 101 in an engaging direction when the cage is moved in an engaging direction. Due to the fact that each individual roller is biased under the influence of the springs and therefore has a certain movement within its recess independently of all of the other rollers, each roller can ride up on its cam independently of the other one, within certain limits. The cage 98 is provided with a plurality of radially disposed lugs 102 against which bear coiled springs 103 interposed between the lugs 102 and a stationary stop 104, whereby the cage is biased through the medium of the springs 103 in a direction to cause the rollers 85 to ride up on the cams 96. The cage 98 is also provided with a cam-shaped lug 105 radially extending, which lug is adapted to be engaged by the pin 89 on the dog 36 for the purpose of rocking the cage in the opposite direction to cause the rollers 85 to drop in the sockets 97 and therefore assume a disengaged position when the dog 36 is engaged.

I claim as my invention:

1. In a change speed transmission, the combination with a driving shaft and a driven shaft, of a planetary gear drive for establishing a relatively fast speed drive from said driving shaft to said driven shaft and including a driving gear and a control gear, operator controlled means for holding said control gear of said planetary gear drive against rotation to establish said drive between said shafts through said gearing, and a second planetary gear drive for establishing a relatively slow speed drive from said driving shaft to said driven shaft including a driving gear and a control gear holding means for holding said control gear of said second planetary gearing against rotation, the driving gear of said fast speed drive being driven from the driving shaft independently of the driving gear of said slow speed driving gear said holding means being inoperative during the operation of said fast speed drive and operating automatically in response to a release of said fast speed drive to establish said relatively low speed drive.

2. In a change speed transmission, the combination with a driving shaft and a driven shaft, of a planetary gear drive for establishing a relatively fast speed drive from said driving shaft to said driven shaft and including a driving gear and a control gear, means for holding said control gear of said gearing against rotation to establish a drive between said shafts through said gearing, operator controlled fluid pressure means for controlling the operation of said holding means, and a second planetary gear drive for establishing a relatively slow speed drive from said driving shaft to said driven shaft including a driving gear and a control gear holding means for holding the control gear of said second planetary gearing against rotation, the driving gear of said fast speed drive being driven from the driving shaft independently of the driving gear of said slow speed driving gear said holding means being inoperative during the operation of said fast speed drive and operating automatically in response to the release of said fast speed drive to establish said relatively slow speed drive.

3. In a change speed transmission, the combination with a driving shaft and a driven shaft, of a planetary gear drive for establishing a relatively fast speed drive from said driving shaft to said driven shaft including a driving gear driven from the driving shaft and a control gear, means for holding said control gear of said planetary gearing against rotation to establish a drive from said driving shaft to said driven shaft through said gearing, said means including a radially movable dog rotatively stationary, and a second planetary gear drive for establishing a relatively slow speed drive from said driving shaft to said driven shaft including a second driving gear driven from said driving shaft independently of the driving gear of said first speed drive and a control gear, said holding means for holding said control gear of said second gearing against rotation, said second holding means being inoperative during the operation of said fast speed drive and operating automatically in response to release of said fast speed drive to establish said relatively slow speed drive.

4. In a change speed transmission, the combination with a driving shaft and a driven shaft, of a planetary gear drive for establishing a relatively fast speed drive from said driving shaft to said driven shaft including a driving gear driven from said driving shaft and a control gear, means for holding said control gear of said gearing against rotation to establish said relatively fast speed drive through said gearing from said driving shaft to said driven shaft, said means including a radially movable dog rotatively stationary, fluid pressure means for controlling the movement of said dog, and a second planetary gear drive for establishing a relatively slow speed drive from said driving shaft to said driven shaft, including a second driving gear driven from said driving shaft independently of the driving gear of said fast speed drive and a control gear holding means for holding said control gear of said second shaft against rotation, said holding means being inoperative during the operation of said fast speed drive and operating automatically in response to the release of said relatively fast speed drive to establish said relatively slow speed drive.

5. In a change speed transmission, the combination with a driving shaft and a driven shaft, of a planetary gear drive for establishing a relatively high speed drive from said driving shaft to said driven shaft, means for holding a control gear of said gearing against rotation to establish a drive from said driving shaft to said driven shaft through said gearing, including a radially movable dog rotatively stationary, means for biasing said dog into engaging position, fluid pressure means for moving said dog into disengaging position against said biasing means, and a second planetary gear drive for establishing a relatively slow speed drive from said driving shaft to said driven shaft including a holding means for holding a control gear of said second gearing against rotation, said holding means being inoperative during the operation of said fast speed drive and operating automatically in response to the release of said relatively fast speed drive to establish said relatively slow speed drive.

6. In a change speed transmission, the combination with a driving shaft and a driven shaft, of a planetary gear drive for establishing a relatively fast speed drive from said driving shaft to said driven shaft and including a driving gear and a control gear, means for holding said control gear of said gearing against rotation to establish a drive from said driving shaft to said driven shaft through said gearing, and a second planetary gear drive for establishing a relatively slow speed drive from said driving shaft to said driven shaft, said second drive including a driving gear and a control gear driven from the driving shaft independently of said first-mentioned driving gear and a one-way holding means for holding said control gear of said second planetary gearing drive against rotation in one direction while permitting said control gear to rotate in the opposite direction during the establishment of a drive between said driving shaft and said driven shaft through said relatively fast speed gearing, said one-way holding means operating automatically in response to release of said relatively fast speed drive to establish said relatively slow speed drive.

7. In a change speed transmission, the combination with a driving shaft and a driven shaft, of a planetary gear drive for establishing a relatively fast speed drive from said driving shaft to said driven shaft through said gearing, operator controlled means for holding a control gear of said gearing against rotation to establish a drive from said driving shaft to said driven shaft through said gearing, a second holding means for said control gear operating to hold said control gear against rotation in one direction only, and a second planetary gear drive for establishing a relatively slow speed drive from said driving shaft to said drive shaft including holding means for holding a control gear of said second gearing against rotation, said holding means being inoperative during the operation of said fast speed drive and operating automatically in response to the release of said fast speed drive to establish said slow speed drive.

8. In a change speed transmission, the combination with a driving shaft and a driven shaft, of a planetary gear drive for establishing a relatively fast speed drive from said driving shaft to said driven shaft through said gear drive, operator controlled means for holding a control gear of said planetary gearing against rotation to establish said relatively fast speed drive, a second holding means for said control gear for holding said control gear against rotation in one direction only, means for biasing said second holding means in engaging direction, means for moving said second holding means into disengaged position under predetermined operating conditions of said drive, and a second planetary gear drive for establishing a relatively slow speed drive from said driving shaft to said driven shaft including a holding means for holding a control gear of said second gearing against rotation, said holding means being inoperative during the operation of said fast speed drive and operating automatically in response to release of said fast speed drive to establish said slow speed drive.

9. In a change speed transmission, the combination with a driving shaft and a driven shaft, of a planetary gear drive for establishing a relatively fast speed drive from said driving shaft to said driven shaft through said gear drive, operator controlled means for holding a control gear of said gearing against rotation to establish said relatively fast speed drive from said driving shaft to said driven shaft through said gearing, a second holding mens for said control gear for holding said control gear against rotation in one direction only, means for biasing said second holding means in engaging position, fluid pressure means for moving said second holding means into disengaged position, and a second planetary gear drive for establishing a relatively slow speed drive from said driving shaft to said driven shaft including a holding means for holding a control gear of said second gearing against rotation, said last-mentioned holding means being inoperative during the operation of said fast speed drive and operating automatically in response to release of said relatively fast speed drive for establishing said relatively slow speed drive.

10. In a change speed transmission, the combination with a driving shaft and a driven shaft, of a planetary gear drive for establishing a relatively fast speed drive from said driving shaft to said driven shaft including a driving gear driven from said driving shaft and a control gear, operator controlled positively interengaging members for holding said control gear of said planetary gear drive against rotation to establish said drive between said shafts through said gearing, and a second planetary gear drive for establishing a relatively slow speed drive from said driven shaft to said driving shaft including a second driving gear driven from said driving shaft independently of the driving gear of said fast speed drive and a control gear and holding means for holding said control gear of said second planetary gearing against rotation, said holding means being inoperative during the operation of said fast speed drive and operating automatically in response to release of said fast speed drive to establish said relatively slow speed drive.

11. In a change speed transmission, the combination with a driving shaft and a driven shaft, of a planetary gear drive for establishing a relatively fast speed drive from said driving shaft to said driven shaft and including a driving gear and a control gear, operator controlled positively interengaging members, one of which is rotatively stationary and one of which is radially movable for holding said control gear of said planetary gear drive against rotation to establish said drive between said shafts through said gearing and a second planetary gear drive for establishing a relatively slow speed drive from said driven shaft to said driving shaft including a driving gear driven from the driving shaft independently of the fast speed driving gear and a control gear and holding means for holding said control gear of said second planetary gear against rotation, said holding means being inoperative during the operation of said fast speed drive, and operating automatically in response to a release of said fast speed drive to establish said relatively slow speed drive.

12. In a change speed transmission, the combination with a driving shaft and a driven shaft, of a planetary gear drive for establishing a relatively fast speed drive from said driving shaft to said driven shaft and including a driving gear driven from said driving shaft and a control gear, positively interengaging members, one of which is movable into and out of engagement with the other element for holding said control gear of said planetary gear drive against rotation to establish said drive between said shafts through said gearing, a fluid pressure motor for moving said movable holding member in one direction, means biasing said movable holding member in the opposite direction, operator control means for controlling the admission of fluid pressure to said motor and a second planetary gear drive for establishing a relatively slow speed drive from said driven shaft to said driving shaft including a driving gear driven from said driving shaft independently of said first mentioned driving gear and a control gear and holding means for holding said control gear of said second planetary gear against rotation, said holding means being inoperative during the operation of said fast speed drive and operating automatically in response to a release of said fast speed drive to establish said relatively slow speed drive.

13. In a change speed transmission, the combination with a driving shaft and a driven shaft, of a planetary gear drive for establishing a relatively fast speed drive from said driving shaft to said driven shaft through said gearing, operator controlled means for holding a controlled gear of said gearing against rotation to establish a drive from said driving shaft to said driven shaft through said gearing, a second holding means for holding said control gear and operating to hold said control gear against rotation and a second planetary gear drive for establishing a relatively slow speed drive from said driving shaft to said gearing shaft, holding means for holding a control gear of said second gearing against rotation inoperative during the operation of said fast speed drive and operating automatically in response to the release of said fast speed drive to establish said relatively slow speed drive.

14. In a change speed transmission, the combination with a driving shaft and a driven shaft, of a planetary gear drive for establishing a relatively fast speed drive from said driving shaft to said driven shaft through said gearing, operator controlled means for holding a control gear of said gearing against rotation to establish a drive from said driving shaft to said gearing shaft through said gearing, a second holding means for said control gear operating to hold said control gear against rotation, means for biasing said second holding means in engaging direction, means for moving said second holding means into disengaging position and a secondary planetary gear drive for establishing a relatively slow speed drive from said driving shaft to said driven shaft, including holding means for holding a control gear of said second gearing against rotation, said holding means for the control gear of said slow speed drive being inoperative during the operation of said fast speed drive and operating automatically in response to release of said fast speed drive to establish said slow speed drive.

15. In a change speed transmission, the combination with a driving shaft and a driven shaft, of a planetary gear drive for establishing a relatively fast speed drive from said driving shaft to said driven shaft through said gearing, operator control means for holding a control gear of said gearing against rotation to establish a drive from said driving shaft to said driven shaft through said gearing, a second holding means for holding said control gear against rotation, means for biasing said second holding means into engaging position and fluid pressure means for moving said second holding means into disengaging position, and a second planetary gear drive for establishing a relatively slow speed drive from said driving shaft to said driven shaft including holding means for holding a control gear of said second gear drive against rotation, said holding means for the second gear drive being inoperative during the operation of said fast speed drive and operating automatically in response to the release of said fast speed drive to establish said relatively slow speed drive.

16. In a change speed transmission, the combination with a driving shaft and a driven shaft, of a planetary gear drive for establishing a relatively fast speed drive from said driving shaft to said driven shaft through said gearing, operator control means for holding a control gear of said gearing against rotation to establish a drive from said driving shaft to said driven shaft through said gearing, a second holding means for holding said control gear of said gearing against rotation, means for biasing said second holding means into engaging position, fluid pressure means operating in response to the oil pressure of the engine for moving said second holding means into disengaged position, and a second planetary gear drive for establishing a relatively slow speed drive from said driving shaft to said driven shaft including the holding means for holding a control gear of said second gearing against rotation, said holding means for the second gear drive being inoperative during the operation of said fast speed drive and operating automatically in response to the release of said fast speed drive to establish said slow speed drive.

17. In a change speed transmission, the combination with a driving shaft and a driven shaft, of a planetary gear drive for establishing a relatively fast speed driving shaft to said driven shaft through said gearing, operator controlled means for holding a control gear of said gearing against rotation to establish a drive from said driving shaft to said driven shaft through said gearing, a second holding means for said control gear for holding said control gear against rotation, means for biasing said second holding means into engaging position, means responsive to manipulation of the engine throttle for moving said second holding means into disengaged position, and a second planetary gear drive for establishing a relatively slow speed drive from said driving shaft to said driven shaft including means for holding a control gear of said second gearing against rotation, said last mentioned holding means being inoperative during the operation of said fast speed drive and operating automatically in response to the release of said fast speed drive to establish said relatively slow speed drive.

18. In a change speed transmission, the combination with a driving shaft and a driven shaft, of a planetary gear drive for establishing a relatively fast speed drive from said driving shaft to said driven shaft through said gearing, operator control means for holding a control gear of said gearing against rotation to establish a drive from said driving shaft to said driven shaft through said gearing, a second holding means for said control gear, means for biasing said second holding means into engaging position, means responsive to engine torque for moving said second holding means into disengaged position, and a second planetary gear for establishing a relatively slow speed drive from said driving shaft to said driven shaft including holding means for holding a control gear of said second gearing against rotation, said last mentioned holding means being inoperative during the operation of said fast speed drive and operating automatically in response to the release of said fast speed drive to establish said relatively slow speed drive.

19. In a change speed transmission, the combination with a driving shaft and a driven shaft, of a planetary gear drive for establishing a relatively fast speed drive from said driving shaft to said driven shaft through said gearing, operator controlled means for holding a control gear of said gearing against rotation to establish a drive from said driving shaft to said driven shaft through said gearing, a second holding means for said control gear operating to hold said control gear against rotation, means for biasing said second holding means into engaged position, fluid pressure means responsive to throttle manipulation of the engine for moving said second holding means into disengaged position, and a second planetary gear for establishing a relatively slow speed drive from said driving shaft to said driven shaft including holding means for holding a control gear of said second gearing against rotation, said last mentioned holding means being inoperative during the operation of the fast speed driving and operating automatically in response to the release of said fast speed drive to establish said slow speed drive.

20. In a change speed transmission, the combination with a driving shaft and a driven shaft, of a planetary gear drive for establishing a relatively fast speed from said driving shaft to said driven shaft including said gearing, operator control means for holding a control gear of said gearing against rotation to establish a drive from said driving shaft to said driven shaft through said gearing, a second holding means for said control gear operating to hold said control gear against rotation, means for biasing said second holding means into engaging position, fluid pressure means responsive to engine torque for moving said second holding means into disengaging position, and a second planetary gear drive for establishing a relatively slow speed drive from said driving shaft to said driven shaft including holding means for holding a control gear of said second gearing against rotation, said last mentioned holding means being inoperative during the operation of said fast speed drive and operating automatically in response to the release of said fast speed drive to establish said relatively slow speed drive.

21. The combination with a driving shaft and a driven shaft, of a planetary gear drive for establishing a relatively fast speed drive from said driving shaft to said driven shaft through said gearing, means for holding a control gear of said gearing against rotation to establish a drive of said driven shaft from said driving shaft through said gearing, a second planetary gear drive for establishing a relatively slow speed drive to said driving shaft from said driven shaft, means for holding a control gear of said relatively slow speed gearing to establish a drive through said gearing from said driving to said driven shaft and operable to establish said slow speed drive when said fast speed drive is released, certain of the gears of said planetary gear drives being axially displaceable in response to torque load imposed thereon and fluid pressure means responding to the displacement of said gears for indicating the torque load imposed on either said fast speed drive or said slow speed drive.

22. The combination with a driving shaft and a driven shaft, of a planetary gear drive for establishing a relatively fast speed drive from said driving shaft to said driven shaft, means for holding a control gear of said gearing against rotation to establish a relatively fast speed drive from said driving shaft to said driven shaft through said gearing, a second planetary gear drive for establishing a relatively slow speed drive from said driving shaft to said driven shaft, means for holding a control gear of said second planetary gear drive against rotation to establish a drive from said driven shaft to said driving shaft through said gearing when said relatively fast speed gear drive is released, certain of the gears of said gear drives having an axial thrust imposed thereon in response to the torque load imposed thereon by the driving mechanism, and means responsive to said axial thrust for indicating the torque load imposed on said gears by said driving mechanism.

23. The combination with a driving shaft and a driven shaft, of a planetary gear drive for establishing a relatively fast speed drive from said driving shaft to said driven shaft, means for holding a control gear of said gearing against rotation to establish a drive from said driving shaft to said driven shaft through said gearing, a second planetary gear drive for establishing a relatively slow speed drive to said drive shaft from said driven shaft, means for holding a control gear of said relatively slow speed drive against rotation to establish a drive from the driving shaft to the driven shaft through said gearing, said planetary gear drives including spiral gears axially movable and at least one spiral gear axially stationary to provide an axial thrust on said movable gears in response to a torque driving load imposed thereon, and means responsive to the axial thrust of said axially movable gears for indicating the driving torque load imposed on either said fast speed or said slow speed drive.

24. The combination with a driving shaft and driven shaft, of a planetary gear drive for establishing a relatively fast speed drive from said driving shaft to said driven shaft, means for holding a control gear of said gearing against rotation to establish a drive of said driven shaft from said driving shaft through said gearing, a second planetary gear drive for establishing a relatively slow speed drive to said driving shaft from said driven shaft, holding means for holding a control gear of said relatively slow speed drive against rotation to establish a drive from the driving shaft to said driven shaft when said fast speed drive is released, said drives including spiral gears at least one of which is axially stationary and at least others of which are axially movable under torque drive imposed thereon, a pressure chamber having one wall stationary and the other wall connected with said axially movable gears and receiving axial thrust from said axially movable gears in response to a torque drive imposed on said gears, and an indicator connected with said pressure chamber and responsive to the variation in pressure created therein as a result of the axial thrust of the movable wall thereof.

25. In a change speed transmission, the combination with a driving shaft and a driven shaft, of a planetary gear drive for establishing a relatively fast speed drive from said driving shaft to said driven shaft, operator controlled means for holding the control gear of said planetary gear drive against rotation to establish said drive between said shafts through said gearing, a second planetary gear drive for establishing a relatively slow speed drive from said driven shaft to said driving shaft, including holding means for holding a control gear of said second planetary gear against rotation, said last mentioned holding means being inoperative during the operation of said fast speed drive and operating automatically in response to release of said fast speed drive to establish said relatively slow speed drive, and means for positively preventing the operation of said last mentioned holding means when said operator controlled holding means is moved into operating position.

26. In a change speed transmission, the combination with a driving shaft and a driven shaft, of a planetary gear drive for establishing a relatively fast speed drive from said driving shaft to said driven shaft, operator controlled means for holding a control gear of said planetary gear drive against rotation to establish said drive between said shafts through said gearing, a second planetary gear drive for establishing a relatively slow speed drive from said driven shaft to said driving shaft including one-way holding means for holding a control gear of said second planetary gear against rotation, said one-way holding means being inoperative during the operation of said fast speed drive and operating automatically in response to a release of said fast speed drive to establish said relatively slow speed drive, and means for positively holding said one-way holding means against operation when said operator controlled holding means is in holding position.

27. In a change speed transmission, the combination with a driving shaft and a driven shaft, of a planetary gear drive for establishing a relatively fast speed drive from said driving shaft to said driven shaft, operator controlled means for holding a control gear of said planetary gear drive against rotation to establish said drive between said shafts through said gearing, a second planetary gear drive for establishing a relatively slow speed drive from said driven shaft to said driving shaft, holding means for holding a control gear of said second planetary gearing against rotation, said second mentioned holding means including cam engaging rollers and being inoperative during the operation of said fast speed drive and operating automatically in response to release of said fast speed drive to establish said relatively slow speed drive, and means for preventing the movement of said rollers into engaging position while said operator controlled means is in engaged position.

28. In a change speed transmission, in combination, a driving and a driven shaft, two sets of planetary gear drives for establishing respectively a fast speed drive from the driving shaft to the driven shaft, and a relatively slow speed drive from the driving shaft to the driven shaft, each set of gears including a driving gear driven directly from the driving shaft, the fast speed set of gears including a control gear, means for holding said control gear against rotation, and operator control means for releasing said control gear, the second set of planetary gears including a control gear, and holding means for holding said control gear against rotation, said holding means being inoperative during the operation of the first gear drive and operating automatically in response to a release of the first-mentioned control gear to establish a drive through the second set of gears.

29. In a change speed transmission, in combination, a driving shaft and a driven shaft, a planetary gear drive for establishing a fast speed drive from said driving shaft to said driven shaft including a driving annulus gear driven from the driving shaft, operator means for holding a control gear of said planetary gear drive against rotation to establish said drive between said shafts through said gearing, and a second planetary gear drive for establishing a relatively slow speed drive from said driving shaft to said driven shaft including a driving sun gear driven from said driving shaft independently of said driving gear of said fast speed planetary gear drive and including holding means for holding a control gear of said second planetary gearing against rotation, said holding means being inoperative during the operation of said fast speed drive and operating automatically in response to the release of said fast speed drive to establish said relatively slow speed drive.

30. In a change speed transmission, in combination, a driving shaft and a driven shaft, two sets of planetary gear drives for establishing respectively a relatively fast speed drive from said driving shaft to said driven shaft and a relatively slow speed drive from said driving shaft to said driven shaft, the planet gears of one set of planetary gearing being driven gears and the planet gears of the other set being driving gears, the annulus gear of one set being the driving gear and the annulus gear of the other set being the reaction gear and the sun gear of one of said sets of planetary gears being a reaction gear and the sun gear of the other set being the driving gear, operating control means for holding the control gear of the fast speed planetary gear drive against rotation to establish said drive between said shafts through said gearing, and holding means for holding a control gear of the second planetary gearing against rotation, said holding means being inoperative during the operation of said fast speed drive and operating automatically in response to release of said fast speed drive to establish said relatively low speed drive.

31. In a change speed transmission, the combination with a driving shaft and a driven shaft, of a planetary gear drive for establishing a relatively fast speed drive from said driving shaft to said driven shaft, operator control means for holding a control gear of said planetary gear drive against rotation to establish said drive between said shafts through said gearing and a second planetary gear drive for establishing a relatively slow speed drive from said driving shaft to said driven shaft including holding means for holding a control gear of said second planetary gearing against rotation, said holding means being inoperative during the operation of said fast speed drive and operated automatically in response to a release of said fast speed drive to establish said relatively low speed drive, the gears of said low speed drive being drivingly idle when said high speed drive is operating to drive the driven shaft from the driving shaft.

32. In a change speed transmission, the combination with a driving shaft and a driven shaft, of two sets of planetary pinions drivingly connected to said driven shaft, a reaction gear associated with one set of said pinions, means for holding said reaction gear against rotation, a driving gear associated with said one set of pinions and drivingly connected to the driving shaft to establish a drive to said driven shaft when said reaction gear is held against rotation, a second driving gear drivingly connected with said driving shaft and associated with the other set of pinions, a second reaction gear associated with said other set of pinions, and means for holding said second reaction gear against rotation, automatically operable when said first mentioned holding means is released, and means for controlling the operation of said first mentioned holding means.

33. In a change speed transmission, the combination with a driving shaft and a driven shaft, of two sets of planet pinions drivingly connected to said driven shaft, a reaction gear associated with one set of said pinions, a radially movable dog for holding said reaction gear against rotation, a driving gear associated with said one set of pinions and drivingly connected to the driving shaft to establish a drive to said driven shaft when said reaction gear is held against rotation, a second driving gear drivingly connected with said driving shaft and associated with the other set of pinions, a second reaction gear associated with said second set of pinions, means for holding said second reaction gear against rotation, automatically operable when said dog is released, and means for controlling the operation of said dog.

34. In a change speed transmission, the combination with a driving shaft and a driven shaft, of two sets of planet pinions drivingly connected to said driven shaft, a reaction gear associated with one set of said pinions, a radially movable dog for holding said reaction gear against rotation, a driving gear associated with said one set of pinions and drivingly connected to the driving shaft to establish a drive to said driven shaft when said reaction gear is held against rotation, a second driving gear drivingly connected with said driving shaft and associated with the other set of pinions, a second reaction gear associated with said second set of pinions, means for holding said second reaction gear against rotation, automatically operable when said dog is released, means for biasing said dog in one direction, and fluid pressure means for moving said dog in the opposite direction.

35. The combination with a driving shaft and a driven shaft, of two sets of planet pinions drivingly connected with said driven shaft, a ring gear drivingly connected with said driving shaft and associated with one set of said planet pinions, a sun gear associated with said one set of planet pinions, means for holding said sun gear against rotation to establish a drive from said driving shaft to said driven shaft at one speed, a sun gear drivingly connected with said driving shaft and associated with the other set of planet pinions, a ring gear associated with said other set of planet pinions, and means for holding said ring gear against rotation, automatically operable to hold said gear and establish a drive to said driven shaft at a different speed upon the release of said first mentioned holding means.

36. In a change speed transmission, the combination with a driving shaft and a driven shaft, of a planetary gear drive for establishing a relatively fast speed drive from said driving shaft to said driven shaft, operator controlled means for holding a control gear of said planetary gear drive against rotation to establish said drive between said shafts through said gearing and a second planetary gear drive for establishing a relatively slow speed drive from said driving shaft to said driven shaft including holding means for holding a control gear of said second planetary gear against rotation, said holding means being operative in one direction only and including a cam member, a roller engaged member and rollers cooperating with the cams of said cam member and with said roller engaged member, an oscillating roller cage for maintaining said rollers in position and moving the same into and out of engaging position, said rollers having a limited movement within said casing, means for biasing said rollers in an engaging direction in said cage, biasing means for oscillating said casing in a direction to move said rollers into engaging position, and means operated by the movement of said operator controlled means into holding position for oscillating said cage in a direction to move said rollers into disengaged position.

WILLIAM B. BARNES.